9153X
Mills & Fernald,
Compressing Air.
Patented Oct. 10, 1835.
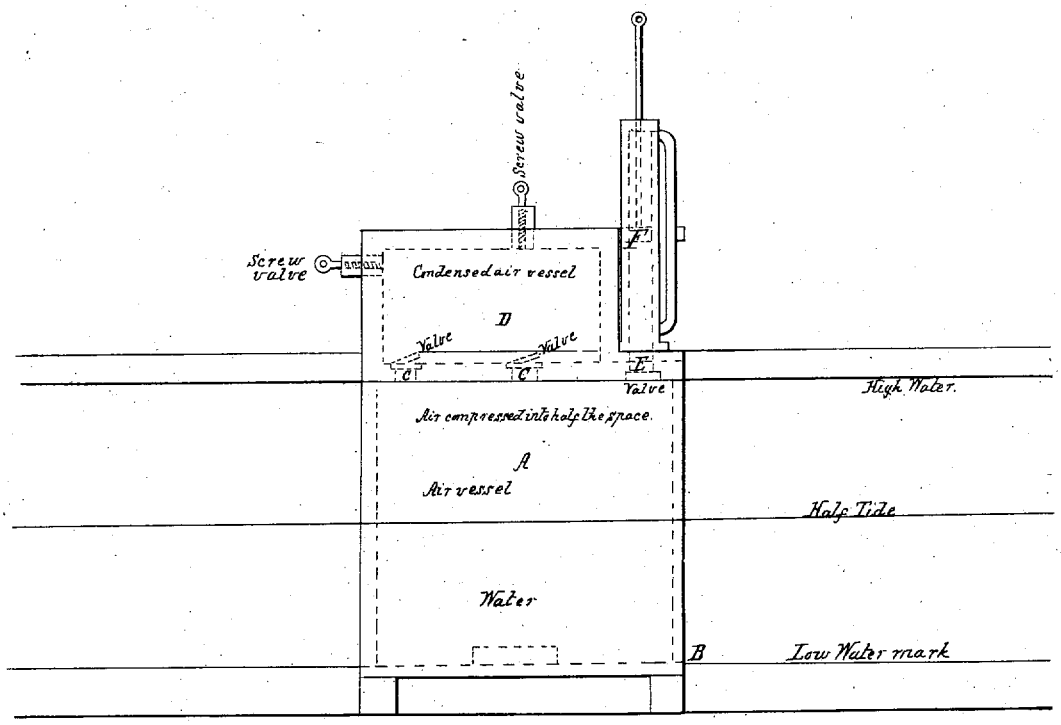
Transparent view of the upper & lower air vessels shewing the action of the valves &c
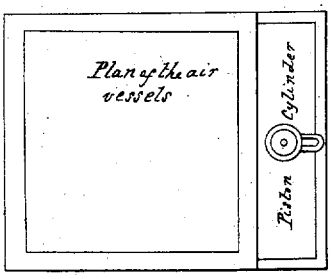
N. PETERS, PHOTO-LITHOGRAPHER, WASHINGTON, D. C.

Robert Mills and Henry B. Fernald 9153X

Letters Patent.

The schedule referred to in these Letters Patent and making part of the same containing a description in the words of the said Robert Mills and Henry B. Fernald themselves of their improvement in the application of Hydrostatics & Pneumatics to the propulsion of Machinery &c.

Know all men by these presents that we Robert Mills (now) of the City of Washington District of Columbia, and Henry B. Fernald of Portland in the County of Cumberland and State of Maine, have discovered a new and use ful improvement in Hydrostatics & Pneumatics, which consists in applying the rising and falling of the tides and other waters, to condensing Atmospheric air and using such condensed air as a motive power to drive machinery; and that the following is a full and exact description of the plan and operation of the same, An air tight room or rooms of sufficient strength and dimensions either of wood or metal must be constructed and immov able fixed in such a manner that the water shall be allowed to flow into it thro an aperture or apertures, in the bottom or sides, on the top of these air chambers are to be placed one or more valves opening upward into a recipient or recipients, which are to receive the air after it is condensed they being provided with suitable screw valves to admit of using the con densed air at pleasure (see drawing annexed), Operation.

The air tight room or rooms, A. being placed so that the bottom will be as near low water mark B. as circumstances will admit; and being filled with Atmospheric air) the rising water will compress and force the air upwards thro the valves C.C, into the air tight recipient or recipients D. from whence it may be applied like steam by means of the screw valves 1.2. and in the falling of the water there will be a vacuum created or a tendency to that effect in the air chamber or room A. and the atmosphere being admitted thro a valve E. opening inward, will rush with a force proportionable to the base of the air

9153X

Air Room, or chamber, and thus a power will be gained in the falling of the tide, or water, which may also be employed to condense more air, or other use by making the pressure of this air to work a wheel or piston as F. before it enters the air chamber;

It will be perceived from the above description that a propelling power will be thus obtained at little expense, and that it will be a perpetual power, as long as the tide shall continue to rise and fall.

In testimony that the above is a full specification of our said improvement as above described, we have hereunto set our hands this twenty first day of September in the year of our Lord One thousand eight hundred and thirty five.

Witnesses

S. D. Fletcher
David Wilkinson

Robt. Mills
Henry B. Fernald (Drawing) 574 [illegible]